United States Patent [19]

Eck

[11] 4,028,938

[45] June 14, 1977

[54] ACOUSTICAL FLOW METER

[75] Inventor: Calvert F. Eck, Osterville, Mass.

[73] Assignee: Ocean Research Equipment, Inc., Falmouth, Mass.

[22] Filed: Jan. 26, 1976

[21] Appl. No.: 652,291

[52] U.S. Cl. .......................................... 73/194 A
[51] Int. Cl.² ........................................ G01F 1/66
[58] Field of Search ................................ 73/194 A

[56] References Cited

UNITED STATES PATENTS

| | | | |
|---|---|---|---|
| 3,564,912 | 2/1971 | Malone et al. | 73/194 A |
| 3,697,936 | 10/1972 | Zacharias | 73/194 A X |
| 3,710,621 | 1/1973 | Asada | 73/194 A |
| 3,869,915 | 3/1975 | Baumoel | 73/194 A |
| 3,918,304 | 11/1975 | Abruzzo et al. | 73/194 A |

Primary Examiner—Richard C. Queisser
Assistant Examiner—John P. Beauchamp
Attorney, Agent, or Firm—Cesari and McKenna

[57] ABSTRACT

An electroacoustical flow meter for measuring flow rates in open and closed channels includes two sets of transducers, one set being positioned upstream relative to the other set. Flow rates are determined by computing the difference between upstream and downstream transit times of acoustical signals transmitted along various paths through the channel. A receiver in the flow meter monitors the acoustical signals received after each transmission. When an acoustical signal is received which has been attenuated due to disturbances such as obstructions along the signal path or interfering reflected signals, the receiver transmits a flag signal. This flag signal is utilized to minimize flow rate reading errors which normally result from such disturbances.

14 Claims, 5 Drawing Figures

ACOUSTICAL FLOW METER

BACKGROUND OF THE INVENTION

1. Field of the Invention

This invention relates to fluid flow measurement, and, more particularly, to an electroacoustical flow meter with signal quality monitoring capabilities.

2. Description of the Prior Art

There are numerous techniques for measuring fluid flow rates in open and closed channels. Some of these techniques are embodied in systems of the electroacoustical type which include one or more acoustical transducer pairs. Each pair includes an upstream and a downstream transducer spaced a fixed distance apart. The flow rate is determined by computing the difference between the upstream and downstream transit times of acoustical signals transmitted through the fluid between the transducers. Prior systems of this type are shown, for example, in U.S. Pat. Nos. 3,237,453 and 3,564,912.

More particularly, in these systems, an acoustical signal is transmitted through the fluid by a first transducer and is received by a second transducer spaced a fixed distance D away from the first. If the acoustical signal is transmitted from an upstream transducer to a downstream transducer, the acoustical propagation is aided by the flow of the fluid and the transit time is reduced. The reverse is true if the acoustical signal is propagated against the flow direction. The difference in the effective speed of sound along and against the direction of flow is proportional to the velocity of the flowing medium relative to the axis between the transducers. Thus, by accurately measuring the difference between the upstream and downstream transit times, $T_u$ and $T_d$, respectively, the flow velocity can be determined. The mathematical relationship for determining the flow velocity V relative to the transducer axis is easily derived and may be expressed as follows:

$$V = (C^2/2D) \Delta T$$

where $\Delta T = T_4 - T_d$, C is the speed of sound in the fluid and D is the distance between transducers.

Systems of this type must employ a relatively accurate timer for measuring acoustical signal transit times through the fluid, particularly for channels with low flow velocities. Additionally, the timer must be started and stopped at precisely the right time. The same electrical impulse that is used to activate the transmitting transducer may also be used to start the transit time timer in the system. Thus, it is fairly simple to synchronize the start of the timer with the start of the acoustical signal transmission through the fluid. Problems are encountered, however, in stopping the timer exactly at the time that the acoustical signal is received by the receiving transducer.

Typically, a system of this type utilizes a threshold receiver, connected to the receiving transducer, which emits a timing signal when the output of the transducer reaches a readily sensed point in its waveform, usually the first zeroaxis crossing. Assuming, for example, that the transducer output undergoes a positive excursion prior to the first axis crossing, the crossing is detected by sensing a negative polarity in the signal. In practice this is done with a threshold detector whose threshold is set at a sufficiently negative level to avoid false triggering because of noise. Because of the steep slope of the waveform in this region, timing errors resulting from noise-like effects on the threshold level are negligible.

The timing signal is used to stop the timer. As long as the acoustical signals received after each pass through the fluid have substantially the same magnitude, the timing signal provides an accurate indication of the end of the transit time period for each pass. However, in many channels, the flow conditions often change from one pass to another causing the magnitude of the acoustical signals received also to change.

Specifically, inhomogeneities in the fluid properties, such as temperature and salinity, or the presence of obstructions, such as air bubbles, silt and debris, can attenuate and distort a propagating acoustical signal. In open channels, random reflections from the upper and lower surface of the channel often combine with a direct pathe signal to produce a received signal, the magnitude of which is dependent on the phase relationship between the reflected and direct path signals. If the attenuation is severe enough, so that no portion of a propagated signal has an excursion greater than the threshold of the zero-crossing detector, these signals go completely undetected. Also, the signal attenuation may be such that the first zero crossing does not have an excursion greater than the threshold of the zero-crossing detector, but the second zero crossing does, causing the detector to respond to the wrong half cycle of the signal. These factors give rise to instabilities in the receiver timing signals, and thereby result in inaccurate and unreliable flow rate readings.

It is therefore, an object of the present invention to provide a flow metering system of improved accuracy.

Another object of the invention is to provide an electroacoustical flow meter with signal quality monitoring capabilities.

Still another object of the invention is to provide an electroacoustical flow meter of the type described which minimizes flow reading errors due to fluid disturbances.

Yet still another object of the invention is to provide an electroacoustical flow meter of the type described which minimizes flow reading errors due to reflected acoustical signals.

Summary

In accordance with the present invention, an electroacoustical flow meter includes a receiver which monitors the quality of each acoustical signal received from the fluid whose flow rate is being measured. Generally, the receiver tests each received signal for the presence of a predetermined normal characteristic, and generates a flag signal indicative of the presence or absence of this characteristic.

More specifically, and in accordance with an illustrative embodiment of the invention, the receiver determines whether a selected portion of a received acoustical signal, e.g., the first negative-going peak, has a predetermined normal magnitude greater than a timing signal threshold of the receiver. As each transmitted acoustical signal is received, the receiver not only transmits a timing signal which is used in determining the transit time of received signal, but also transmits a flag signal which specfies whether the received signal is normal or "bad". In this way, the receiver discriminates between signals which are received under normal propagation conditions, and bad signals which have been unduly attenuated or distorted, in one manner or another, during transmission through the fluid. The flag signal is then used to reduce flow-rate reading errors that normally result from the bad signals. For example, the flag signals may be coupled to a processor which activates a bad signal alarm and restarts or otherwise alters the flow measurement process each time a bad signal is received.

Preferably, the receiver comprises first and second threshold detectors which are coupled to each receiving transducer in the system. An input attenuator section coupled between the threshold detectors and the receiving transducers causes the second threshold detector to respond to a larger magnitude of the received signal than the first. The first, lesser magnitude, threshold detector generates the timing signal which stops a timer. The second, higher amplitude threshold detector has a threshold corresponding essentially to the peak level of the first negative-going peak of a normal signal. An output logic section compares the outputs from the first and second threshold detectors to determine if the first negative-going peak in the received signal has at least the predetermined normal level. Based upon this comparison, the logic section generates the flag signal as a logic signal, the level of which specifies whether the received signal is normal or bad.

The invention is pointed out with particularity in the appended claims. The foregoing and other features and advantages of the invention will be better understood from the following detailed description taken in conjunction with the accompanying drawings.

BRIEF DESCRIPTION OF THE DRAWINGS

FIG. 2, which comprises

DETAILED DESCRIPTION OF ILLUSTRATIVE EMBODIMENT

Figure 1:
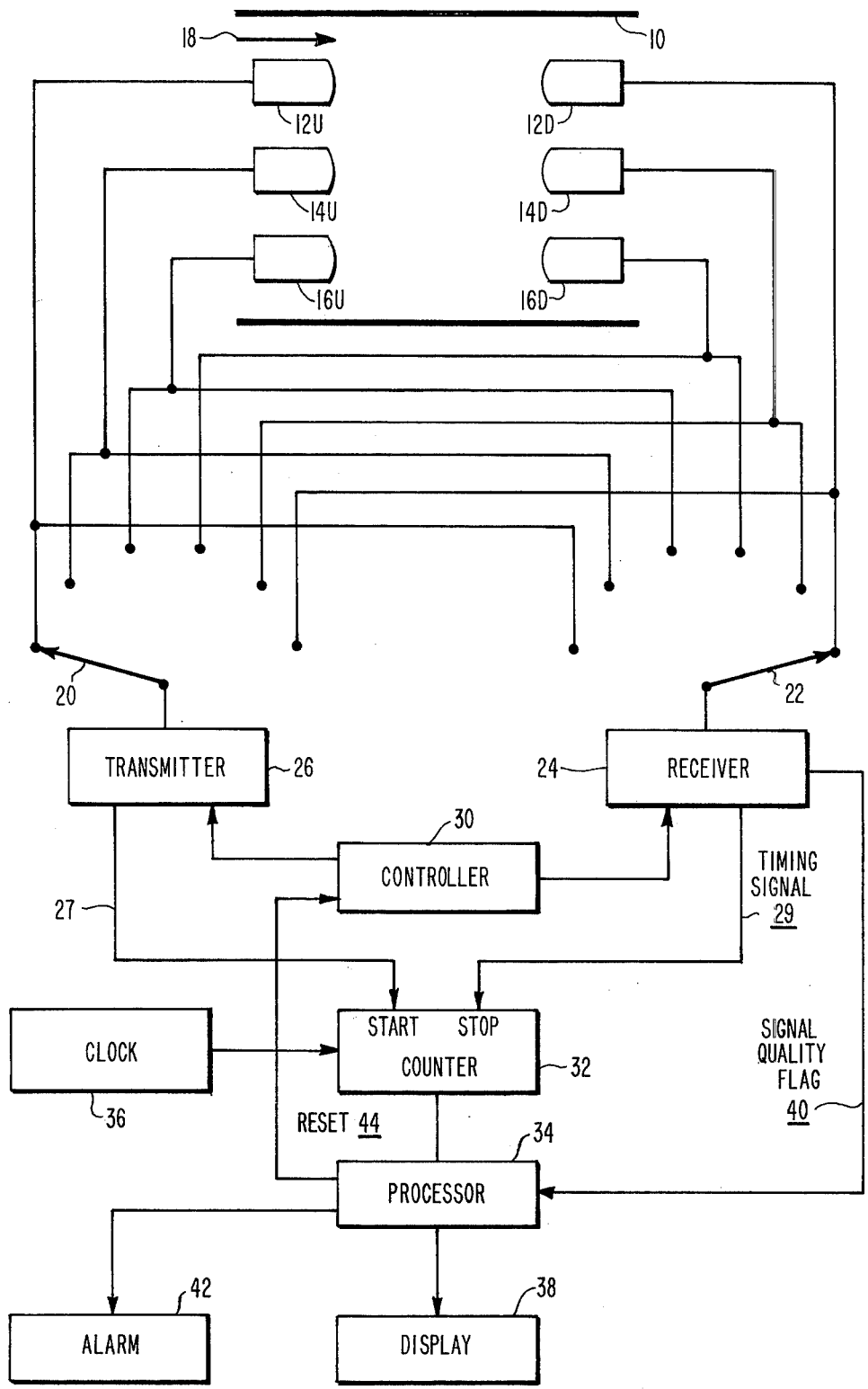
FIG. 1. is a block diagram of a flow metering system embodying the principles of the invention.

In FIG. 1, I have illustrated an open channel 10 whose flow rate is to be measured using the system of the present invention. This channel 10 may, for example, be a relatively large river or stream, which conducts water to a reservoir serving a pumping station, a power plant or other facility. Illustratively, the system monitors the flow rate on a continuous basis so that operators can open and close various control gates to regulate the water flow to the facility. It should be understood, however, that this system has equal application for measuring flow rates through closed channels and pipes.

The system includes two sets of electroacoustical transducers distributed across the channel 10 being monitored. One transducer set is positioned upstream from the other set. The transducer sets may include any number of transducers. In FIG. 1, for example, the upstream set is shown with three transducers 12U, 14U and 16U, and the downstream set is shown with three transducers 12D, 14D and 16D. In practice, however, particularly for relatively large channels more than three transducers in each set would typically be used. Arrow 18 indicates the direction of the fluid flow in the channel 10.

Path selection switches 20 and 22 connect any one of the upstream transducers 12U, 14U, and 16U and the corresponding one of the downstream transducers 12D, 14D and 16D in a circuit with a receiver 24 and a transmitter 26. When the transmitter 26 is activated, it sends an electrical impulse to the transducer to which it is connected by the switch 20, causing that transducer to transmit an acoustical signal through the fluid. This same electrical impulse is fed via a line 27 to a timing mechanism comprising a transit-time counter 32 and a clock 36. The transmitter-generated impulse on the line 27 enables the counter 32 to start counting clock pulses from the clock 36.

The system illustratively operates on opposing transducer pairs only. For example, if one of the upstream transducers 12U, 14U or 16U transmits the acoustical signal, it is received by its opposing downstream transducer 12D, 14D or 16D, respectively. Alternatively, if one of the downstream transducers 12D, 14D or 16D transmits the acoustical signal, it is received by its opposing upstream tranducer 12U, 14U or 16U, respectively. The receiving transducer converts the received acoustical signal to a corresponding electrical signal which is passed through the switch 22 to the receiver 24. When the received signal builds up to the timing signal threshold of the receiver 24, the receiver 24 transmits a timing signal over a line 29. The timing signal stops the counter 32.

A controller 30 controls the path selection switches 20 and 22. Each of the switches 20 and 22 has six possible positions. The controller 30 sequences the switches 20 and 22 incrementally through each of these positions so that transit time data is collected for each opposing transducer pair and each transducer in each pair serves both as a transmitting transducer and a receiving transducer. In this way, both the upstream and downstream transit times are collected for each path.

For example, as viewed in FIG. 1, the controller 30 initially connects the switch 20 to its leftmost position and initially connects the switch 22 to its rightmost position. The upstream transducer 12U is thus serving as the transmitting transducer, while the downstream transducer 12D is serving as the receiving transducer. An electrical impulse is sent by the transmitter 26 to the transducer 12U. The time required for an acoustical signal to pass downstream from the transducer 12U to the transducer 12D is measured by the counter 32. After the counter 32 is stopped, the number contained therein, corresponding to the downstream transit time for that particular pair, is transferred to a processor 34, and the counter 32 is reset.

The controller 30 then increments the switch 20 one position to the right in FIG. 1 and increments the switch 22 one position to the left in FIG. 1. This causes the transducer 14U to serve as the transmitting transducer, and the transducer 14d to serve as the receiving transducer. The timing process is repeated. The number in the counter 32, in this case corresponding to the downstream transit time for the transducer pair 14U − 14D, is also transferred to the processor 34.

The controller 30 continues to increment the switch 20 to the right and the switch 22 to the left, and the timing process is repeated after each increment of the switches. It is noted that after the third increment of the switches 20 and 22, the downstream transducers in the system are serving as transmitting transducers and the upstream transducers are serving as receiving transducers. The numbers transferred to the processor 34 in these cases correspond to the upstream transit times for each pair. After the measurement sequence is completed, the switches 20 and 22 may be returned to their initial positions by the controller 30 in preparation for the next measurement sequence. Alternatively, the direction in which the switches 20 and 22 are incremented may be reversed during the next measurement sequence.

All fixed constants associated with the different acoustical paths between each transducer pair are stored in the processor 34. Thus, for each transducer pair, numbers are stored corresponding to the path length, D, between the transducers, the angle 0, that the acoustical path makes with the fluid flow direction, and the speed of sound, C, through the fluid. With the propagation time data supplied by the counter 32, the processor 34 can thus calculate the fluid flow velocity as measured for each path according to the mathematical relationship set forth previously. The processor 34 then averages the velocities from all the paths to obtain an accurate flow rate measurement for the channel 10. Various weighting factors may also be stored in the processor 34 for use in the averaging function. The processor 34 also controls a display device 38 to provide a visual reading of the channel flow rate.

With the exception of the receiver 24, each of the elements shown in FIG. 1 may be of conventional construction. In accordance with this invention, the receiver 24 not only performs the conventional timing function, but also monitors the quality of the electrical signal received from each receiving transducer after each acoustical signal is passed through the fluid. The receiver 24 sets certain predetermined conditions on the magnitude of the received signal. If a received signal does not meet these conditions, the receiver 24 transmits a "bad " signal flag over a line 40. This flag is then used to reduce the flow rate reading errors that typically arise when a bad signal is received.

Figure 2A:
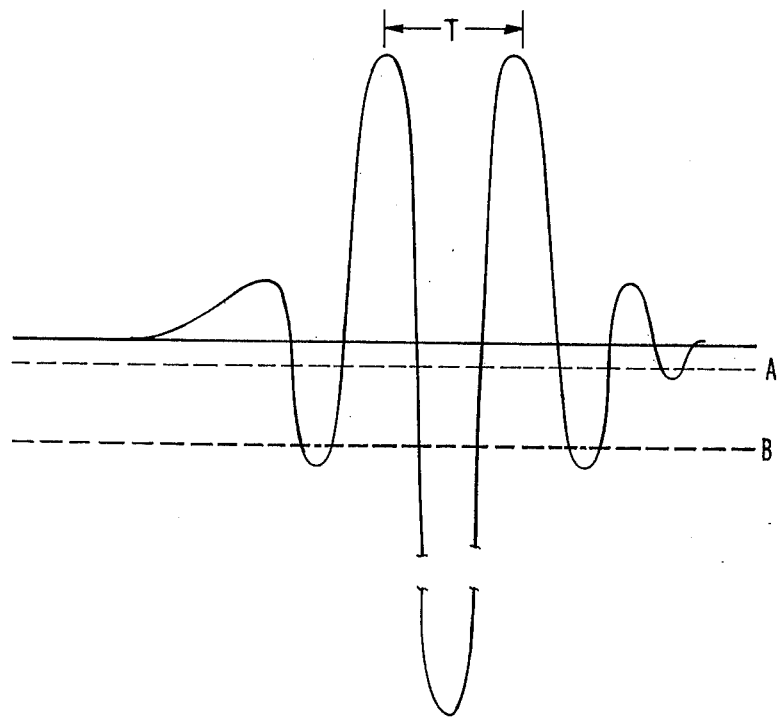
FIGS. 2A, 2B and 2C, illustrates waveshapes of signals received in a system of the type shown in FIG. 1.
Figure 2B:
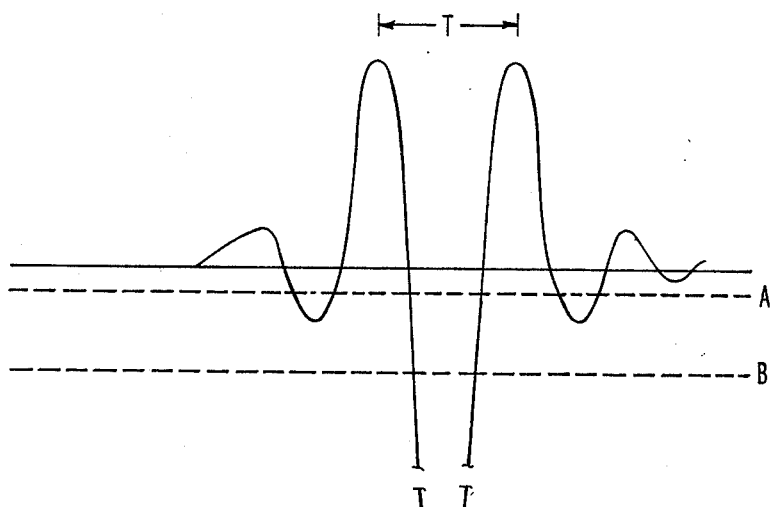
Figure 2C:
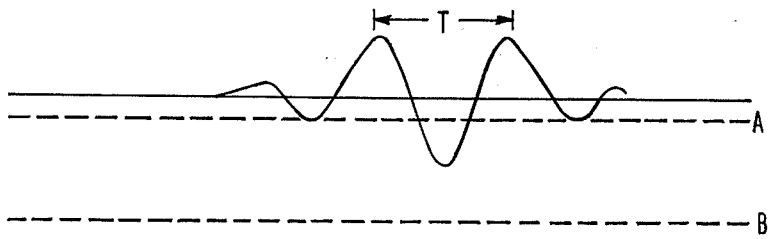

Before proceeding with a more detailed description of the receiver 24 of my invention, I make reference to FIGS. 2A – 2C of the drawings. These figures illustrate typical signal waveshapes in the output of a receiving transducer in an electroacoustical system of the type shown in FIG. 1. As indicated, the signals oscillate with a series of negative-going and positive-going peaks which initially build up in magnitude and then decay to zero. This general waveshape results from the resonant character of the transmitting and receiving tranducers.

Each signal has a periodicity, T, which is also determined by the transducer characteristics. Consequently, the period between successive zero crossings (i.e., ½T), is relatively stable from one pass through the fluid to the next. Also relatively stable from pass to pass are the relative magnitudes of the first two peaks of the same polarity in each of the signals. That is, the ratio of the magnitudes of the first and second positive-going peaks and the ratio of the magnitudes of the first and second negative going peaks are substantially constant in each received signal regardless of variations in the fluid properties. Typically, these magnitude ratios are about 3 to 1. The absolute magnitudes of the peaks in the signals, however, vary widely with fluid conditions.

These factors are illustrated in FIGS. 2A-2C of the drawings. FIG. 2A represents a signal received under normal acoustical propagation conditions. FIGS. 2B and 2C represent signals which have been attenuated to different degrees, for example, due to obstructions passing by in the fluid or to interferring reflected signals. In each of the signals shown in FIGS. 2A-2C, the zero crossings occur at essentially the same time and the magnitude ratios of the first two peaks of the same polarity are essentially equal. The magnitudes of corresponding peaks in the signals of FIGS. 2A, 2B and 2C, however, differ depending upon the degree of attenuation experienced by the acoustical signal during propagation through the fluid.

The dashed line labeled A in FIGS. 2A–2C represents a typical receiver timing signal threshold. Because the time period between successive zero crossings in the received signals are relatively constant, but the magnitudes of the peaks in the signals vary, it is desirable to use a portion of the signal as near as practical to a selected zero crossing in generating the timing signal. It is thus common to choose the timing signal threshold of the receiver such that the timing signal is transmitted shortly after the received signal first goes negative. The dashed line labeled B in each of FIGS. 2A–2C corresponds essentially to the magnitude of the first negative-going peak in a signal, such as that shown in FIG. 2A, which is received under normal propagation conditions.

Selecting the threshold of a receiver at a low magnitude level, such as the level A indicated in FIGS. 2A–2C, reduces, but does not eliminate, problems resulting from deviations in signal magnitudes from normal levels. Specifically, the first negative-going peak in the signal of FIG. 2B builds up in magnitude more slowly than the first negative-going peak in the normal signal of FIG. 2A. Consequently, when a signal such as that shown in FIG. 2B is received, rather than the normal signal shown in FIG. 2A, the transmission of the timing signal is delayed by a short but significant period of time. With a signal of the type shown in FIG. 2C, the timing signal is generated in response to the second negative-going peak and not the first, since the first negative-going peak has a magnitude less than the level A. Thus, the timing signal is generated in response to the wrong half cycle of the signal and is delayed by an even greater length of time when the received signals are of the type illustrated in FIG. 2C. In either case, the delay results in an inaccurate flow-rate reading.

Figure 3:
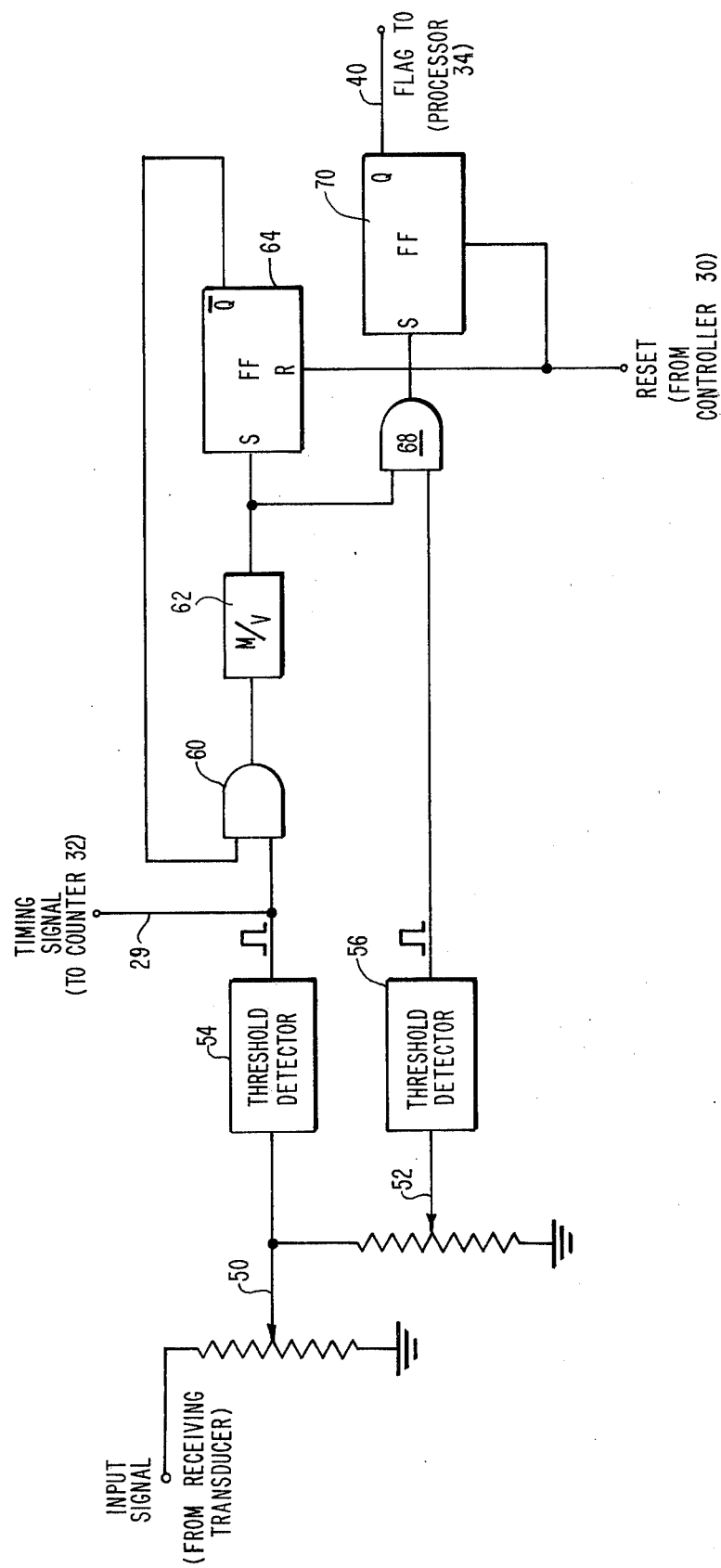
FIG. 3 illustrates further details of a signal quality monitoring receiver of FIG. 1.

My signal quality monitoring receiver 24, shown in block form in FIG. 1, is illustrated in further detail in FIG. 3 of the drawings. The receiver 24 determines whether the selected portion of the received signal (e.g., the first negative-going peak) which causes the transmission of the timing signal also has a normal magnitude such as that indicated by the level B in FIGS. 2A–2c. The receiver 24 thus discriminates between normal signals of the type shown in FIG. 2A and signals such as those shown in FIGS. 2B and 2C which have been attentuated, in one manner or another, during propagation through the fluid. Specifically, the receiver detects if and when the received signal first attains the levels A and B, respectively. If the received signal attains the level B within one half cycle (i.e. ½T) of the time it attains the level A, then the receiver 24 recognizes that the signal is normal. Otherwise, the receiver 24 recognizes that the signal is bad and transmits the bad signal flag.

As indicated in FIGS. 3, the electrical signal from a receiving transducer in the system of FIG. 1 is fed through an attenuator section comprising potentiometers 50 and 52 to a pair of threshold detectors 54 and 56. Each of the threshold detectors 54 and 56 includes conventional components for amplifying and shaping the incoming signal and for generating a logic level output pulse when the voltage of the input signal attains a predetermined threshold level. Preferably, the threshold detectors 54 and 56 have the same gains and inherent threshold levels. The potentiometer 50 provides a combined sensitivity adjustment for the detectors 54 and 56. The potentiometer 52 further attenuates the signal fed to the detector 56 relative to the signal fed to the detector 54. Thus, the detector 56 responds to a larger magnitude than does the detector 54. The received signal is tested by comparing the outputs from the detectors 54 and 56.

Specifically, the threshold detector 54 is selected to have a low magnitude negative threshold level such as that indicated by the dashed line a in FIGS. 2a–2C. Thus, the detector 54 transmits an output pulse shortly after the received signal first goes negative. The leading edge of this pulse from the detector 54 is the timing signal and is used to stop the counter 32.

The potentiometer 52 is adjusted so that the detector 56 develops an output pulse when the incoming signal attains the level indicated by the line B in FIGS. 2A–2C. As noted, the level B is close in value to the magnitude of the first negative-going peak in a normal signal. The specific level B used, of course, varies depending upon the characteristics of the particular components in the system and of the particular channel whose flow rate is being measured. Typically, the level B used is determined on the basis of a number of sample passes through the fluid prior to taking flow rate measurements.

As seen in FIG. 3, the output of the detector 54 is also coupled to an output logic section including an AND gate 60 and a monostable multivibrator 62. Gate 60 is enabled by the reset state of a flip-flop 64. When the detector 54 transmits its output pulse, the leading edge of this pulse triggers the multivibrator 62. The multivibrator 62 emits a pulse, the duration of which is selected to be approximately equal to one-half the acoustical signal period T (FIGS. 2A–2C). The multivibrator pulse determines the time interval during which the outputs of the detectors 54 and 56 are compared.

The pulse from the multivibrator 62 enables anothe AND gate 68 for a time interval equal to ½T. If the first negative-going peak of the incoming signal has a magnitude at least equal to the level B, the detector 56 transmits an ouput pulse during this time interval. The output pulse from the detector 56 is thus passed by the gate 68 and sets a flip-flop 70. The corresponding output of the flip-flop 70 is a signal quality flag which asserts that the incoming signal is normal. This output is coupled by the flag line 40 of FIG. 1 to the processor 34. When the processor 34 receives the transit-time data from the counter 32 of FIG. 1, it senses the level of the flag line 40. If the flag line 40 indicates that the incoming is normal, the measurement process is allowed to continue in the normal sequence.

If, however, the incoming signal is of the type shown in FIG. 2B, the first negative-going peak thereof does not have sufficient magnitude to activate the detector 56. The multivibrator 62 of FIG. 3 is triggered by the output pulse from the detector 54, and the gate 68 is enabled, but no pulse is passed by the gate 68 since the detector 56 is not activated within ½T of the activation of the detector 54. The flip-flop 70 is thus not set. The flag line 40 from the output of the flip-flop 70 thus remains at a level which represents that the incoming signal is bad. Upon receiving the transit time data from the counter 32 of FIG. 1, the processor 34 senses the level of the flag line 40 and recognizes that the received signal is bad. The processor 34 in this event activates the alarm 42 of FIG. 1 and initiates the appropriate corrective operation. For example, the processor 34 resets the controller 30 via the line 44 in FIG. 1 so that the measurement sequence for the particular transducer pair being used is repeated.

It is noted that the second negative-going peak in the signal of FIG. 2B has sufficient magnitude to activate both threshold detectors 54 and 56. The receiver 24 of FIG. 3, however, prevents this portion of the incoming signal from being erroneously interpreted as a normal signal. Specifically, the output of the multivibrator 62 is also coupled to set the flip-flop 64. Thus, when the detector 54 transmits an output pulse responsive to the first negative-going peak of the signal, the resulting output pulse from the multivibrator 62 sets the flip-flop 64.

The output of the flip-flop 64, in turn, disables the input gate 60. If the detector 54 transmits another output pulse responsive to the second negative-going peak in the signal, the multivibrator 62 is not triggered thereby. The gate 68 remains disabled and the flip-flop 70 remains in its reset state. The flag line 40 thus remains at a level representing that the incoming signal is bad. The gate 60 is again enabled only after the flip-flop 64 is reset by the controller 30 of FIG. 1, under the control of the processor 34 or at the start of the next measurement sequence.

If the received signal is of the type shown in FIG. 2C, no portion of the signal has sufficient magnitude to activate the detector 56. As a result, the flip-flop 70 is not set, and the flag line 40 remains at a level representing that the received signal is bad.

Optimum discrimination between normal signals and bad signals is obtained when the ratio B/A of the thresholds of the detectors 54 and 56 is in the range of about 5 to 10. This is due to the fact that the magnitude of the second negative going peak in a received signal is about 3 times the magnitude of the first negative going peak, as noted earlier. Thus, for example, if the detector 54 responds to a signal level of about −1 millivolt, the detector 56 preferably responds to a level of about −5 to −10 millivolts. The ratio B/A can be adjusted to optimize signal discrimination in each case simply by adjusting the potentiometer 52.

In summary, therefore, I have described an electroacoustical flow metering system which incorporates a receiver with signal quality monitoring capabilities. The receiver tests each received acoustical signal for the presence of a predetermined, normal characteristic. This characteristic is illustratively determined on the basis of the magnitude of the first negative going peak in a signal received under normal propagation conditions. The presence of signal-altering disturbances in the fluid flow rate is being measured is thus detected. The effect such disturbances have on the accuracy of system flow readings is thus minimized.

The above-described system is illustrative of only one possible embodiment of the invention. Various modifications and additions to the specific system described may be devised by those skilled in the art without departing from the scope of the invention. For example, the specific orientation and number of transducers used may vary from that shown in FIG. 1 and would depend on the accuracy of the measurements required and the specific characteristics of the channel whose flow rate is being measured. Additionally, althought the receiver 24 of FIG. 3 has been described as responsive to the first negative-going peak in each received signal, the receiver 24 can be readily modified to respond to other portions of the signals including a selected positive going peak. Also, the specific programmed response of the processor 34 to a bad signal flag may vary in complexity, depending upon the particular accuracy requirements in each case. It is, therefore, the object of the appended claims to cover all such variations and modifications as come within the true spirit and scope of this invention.

What I claim as new and desire to secure by Letters Patent of the United States is:

1. Apparatus for determining the flow rate of a fluid medium through a channel of the type comprising first and second transducer means for transmitting and receiving acoustical signals along a path through the fluid medium, the acoustical signals oscillating in magnitude with a series of positive-going and negative-going peaks, said first transducer means being positioned upstream relative to said second transducer means, means for measuring the difference between upstream and downstream transit times of the acoustical signals transmitted between said first and second transducer means, said measuring means being responsive to a selected one of the peaks of the acoustical signals received by said first and second transducer means, respectively, and means responsive to said measuring means for deriving an output signal indicative of the flow rate of the fluid medium through the channel, said apparatus being characterized by A. Means for determining whether the selected peak in the acoustical signals received by said first and second transducer means respectively, has a magnitude at least equal to a predetermined normal level, and B. Means for generating a flag signal indicative of the presence and absence of said predetermined normal magnitude in the selected peak.

2. Apparatus as recited in claim 1 in which said determining means determines whether the first negative going peak in the received signal has a magnitude at least equal to said predetermined normal level.

3. Apparatus as recited in claim 1 in which each of said first and second transducer means convert the received acoustical signal to an electrical signal having a waveshape corresponding to that of the received acoustical signal, in which said testing means includes a first threshold detector for receiving the electrical signal and for transmitting a first signal when the received electrical signal attains a first threshold level and a second threshold detector for receiving the electrical signal and for transmitting a second signal when the received electrical signal attains a second threshold level, said second threshold level being greater in magnitude than said first threshold level, and in which said flag signal generating means is responsive to the first and second signals and generates said flag signal at a first level when the second signal is received within a predetermined time interval of the first signal and at a second level when the second signal is not received within said predetermined time interval of the first signal.

4. Apparatus as recited in claim 3 in which said testing means further includes pulse generating means responsive to the first signal for generating an output pulse of duration equal to said predetermined time interval, and in which said flag signal generating means includes gating means responsive to the second signal and the output pulse from said pulse generating means for transmitting an output pulse when the second signal is received in coincidence with the output pulse from said pulse generating means, and means including a set and reset condition and responsive to said gating means for transmitting said flag signal at the first level when set by the output pulse from said gating means and at second level when not set by the output pulsed from said gating means.

5. Apparatus as recited in claim 4 in which said testing means further includes resettable means coupled between said first threshold detector and said pulse generating means and responsive to the activation of said pulse generating means by the first signal for disabling said pulse generating means.

6. Apparatus as recited in claim 3 in which said second threshold level is in the range of about 5 to 10 times greater in magnitude than said first threshold level.

7. Apparatus as recited in claim 3 in which the received acoustical signal oscillates in magnitude with a periodicity T, and in which said predetermined time interval is approximately equal to ½T.

8. Apparatus as recited in claim 3 in which said first and second threshold detectors are identical, and in which testing means further includes means for attenuating the electrical signal applied to said second threshold detector relative to the electrical signal applied to said first threshold detector so that said second threshold detector responds to a greater magnitude of the electrical signal than said first threshold detector.

9. Apparatus for determining the flow rate of a fluid medium through a channel comprising:

first and second transducer means for transmitting and receiving acoustical signals along a path through the fluid medium, said first transducer means being positioned upstream relative to said second transducer means, the acoustical signals oscillating in magnitude with a series of positive going and negative going peaks;

transmitter means coupled to said first and second transducer means, respectively, for transmitting an activating signal which activates one of said transducer means to transmit an acoustical signal through the fluid medium;

receiver means coupled to said first and second transducer means, respectively, for detecting the receipt by one of said transducer means of an acoustical signal transmitted by the other of said transducer means and for transmitting a timing signal in response thereto, the timing signal being generated in response to a selected one of the peaks of the acoustical signal received by said receiver means attaining a timing signal threshold;

monitoring means coupled to said receiver means for determining whether the selected peak of the acoustical signal received by said receiver means has a predetermined normal magnitude greater than the timing signal threshold and for generating a flag signal indicative of the presence and absence of said predetermined normal magnitude in said selected peak.

10. Apparatus as recited in claim 9 in which said selected peak of the received acoustical signal is the first negative going peak therein.

11. Apparatus as recited in claim 10 in which said receiver means has a threshold level and transmits the timing signal when the first negative-going peak in the received acoustical signal builds up in amplitude to said threshold level, and in which said predetermined normal amplitude of the first negative-going peak in the received acoustical signal is in the range of 5 to 10 times greater than the threshold level of said receiver means.

12. Apparatus for determining the flow of a fluid medium through a channel, said apparatus comprising:
first and second electro-acoustical transducer means for transmitting and receiving signals along a path through the fluid medium, one of said transducer means being positioned upstream relative to the other of said transducer means;
means for transmitting an activating signal which activates one of said transducer means to transmit an acoustical signal through the fluid medium, the acoustical signal oscillating with alternate positive and negative half cycles;
means responsive to the receipt of the acoustical signal by the other of said transducer means for transmitting a timing signal responsive to a selected half cycle of the received acoustical signal attaining a predetermined threshold magnitude;
means responsive to the activating signal and to the timing signal for measuring the transit of acoustical signals transmitted upstream and downstream relative to the fluid medium between said first and second transducer means;
means responsive to said timing means for deriving an output indicative of the flow rate of the fluid medium; and
signal quality monitoring means including means for generating a flag signal indicative of an acoustical signal received under normal propagation conditions through the fluid medium, said generating means generating the flag signal responsive to the selected half cycle of the received acoustical signal attaining a predetermined normal magnitude in excess of said predetermined threshold magnitude, said monitoring means further including means for preventing the generation of the flag signal responsive to other half cycles of the received acoustical signal attaining said predetermined normal magnitude.

13. Apparatus as recited in claim 12 in which the acoustical signal half cycles are defined by first and second zero axis crossings, the second zero axis crossing being spaced by a time interval of T/2 from the first zero axis crossing, in which said detecting means includes a first threshold detector for generating the timing signal responsive to the selected half cycle of the received acoustical signal attaining said predetermined threshold magnitude, in which said flag signal generating means comprises a second threshold detector for generating the flag signal responsive to the selected half cycle of received acoustical signal attaining said predetermined normal magnitude within a time interval of T/2 after generation of the timing signal, and in which said preventing means includes means for disabling said flag signal generating means upon the expiration of the T/2 time interval.

14. Apparatus as recited in claim 13 in which said predetermined threshold magnitude is such that said first threshold detector generates the timing signal responsive to the selected half cycle of the received acoustical signal completing the first zero axis crossing, said predetermined threshold magnitude being displaced sufficiently from zero to avoid the generation of the timing signal as a result of noise in the received acoustical signal and in which said predetermined normal magnitude is between 5 and 10 times greater than said predetermined threshold magnitude.

* * * * *